Nov. 28, 1933.    H. W. JEWELL    1,936,842
CONDUIT CONSTRUCTION
Filed Dec. 7, 1931
Fig. 1.
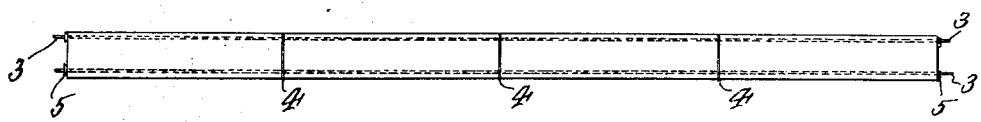
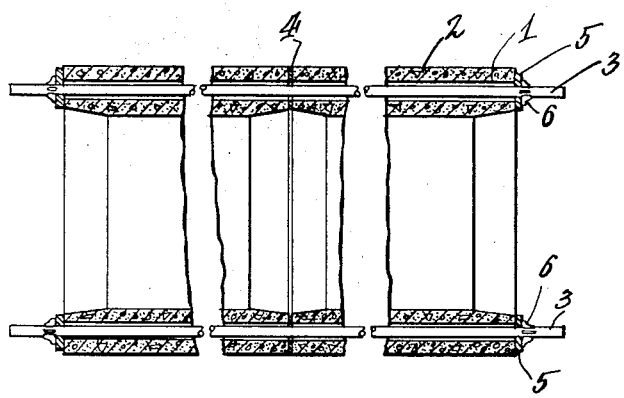
Fig. 2.
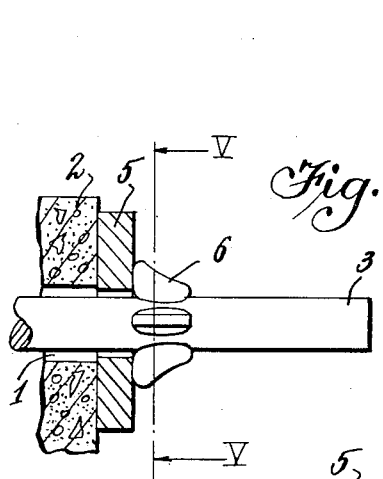
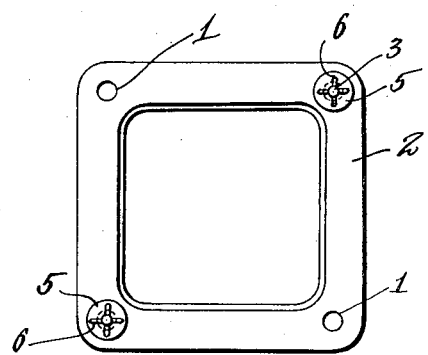
Fig. 4.
Fig. 3.
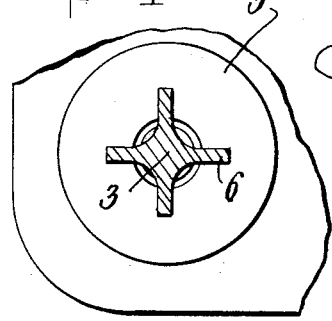
Fig. 5.
Inventor
Howard W. Jewell
By Lyon & Lyon
Attorneys Patented Nov. 28, 1933

1,936,842

UNITED STATES PATENT OFFICE 1,936,842

CONDUIT CONSTRUCTION

Howard W. Jewell, Los Angeles, Calif., assignor to Pacific Clay Products, Los Angeles, Calif., a corporation of California Application December 7, 1931. Serial No. 579,460

1 Claim. (Cl. 247—27)

This invention relates to conduits adapted to be buried in the ground for enclosing electric conductors such as telephone or power cables. It has to do particularly with conduits made of clay or similar material which are not readily provided with threads or other like means for securing consecutive sections together.

A general object of the invention is to reduce the cost and time of laying conduits in a trench. Another object is to effectively seal the joints between sections of conduit.

Still another object is to reduce the danger of damage to cables within a conduit from electrolytic corrosion.

Heretofore, it has been the practice to mold clay conduit in short sections, and to secure the ends of the consecutive sections together at the time they are laid by grouting and wrapping each joint. This method is objectionable for the reasons that it is slow and expensive to grout and wrap a large number of joints in a trench where the space is restricted.

It is not feasible, because of difficulties in manufacture and the likelihood of breakage in transit, to reduce the number of joints which must be made within the trench, by increasing the lengths of the original sections.

In accordance with my present invention, I reduce the number of joints that must be formed within the trench, by joining a plurality of short conduit sections together into a single continuous length before placing them in the trench. The joining together of the individual sections can readily be done either at some central point before the conduit is transported to the location, or it may be done at the location just before a conduit is laid in the trench. In accordance with the invention, the number of joints that must be formed in the trench is greatly reduced without introducing difficulties of manufacture of the conduit, and without introducing large losses occasioned by the necessity of discarding long lengths of conduit where breakage results during transportation.

A full understanding of the invention may be had from the following detailed description taken in connection with the accompanying drawing, in which:

Figure 1 is a general view showing four sections of conduit joined together in accordance with my invention;

Figure 2 is a detail sectional view showing the construction of and the method of joining the sections;

Figure 3 is an end view of a conduit;

Figure 4 is an enlarged detailed view, partly in section, of an end tile and joining wire; and Figure 5 is a sectional view in the plane 5—5 of Figure 4.

Clay conduit is commonly manufactured in sections about eighteen inches long. In accordance with the present invention, I join a number of such sections together to form a single length of conduit. Thus, referring to Figure 1, four sections are shown joined together into one continuous length.

To make possible the joining of a plurality of sections as shown in Figure 1, I form at the time of manufacture, a pair of diametrically opposite dowel holes extending longitudinally through the walls of each section. Thus, in the case of square conduit, as shown in the drawing, holes 1 may be formed in the walls 2 of the conduit at diagonally opposite corners as shown in Figures 2 and 3. These holes are preferably of such size as to freely enclose a No. 12 gauge wire as shown at 3, but are not large enough to materially weaken the wall of the conduit.

In practicing the invention, as many sections of conduit as it is desired to join into a single length are laid end to end and the wires 3 threaded into the holes 1 in successive sections. Washers 4 of paper, felt, or similar material, impregnated with asphalt or other waterproof substance, are threaded onto the wires between the sections, in order to seal the joints between the consecutive sections. When the wires are threaded through all the sections, the latter are forced firmly together by compressing them longitudinally, and are held in place by washers attached to the ends of the wires 3, which project beyond the ends of the completed length of conduit.

Various means may be employed for securing the ends of wires 3 firmly against the end faces of the conduit. For instance, the ends of the wires may be threaded to receive nuts which can be readily tightened against the ends of the tiles by screwing them up. However, a cheaper and more expeditious method is to place a washer over each rod against the end of the conduit and clamp or deform the wire beyond the washer to prevent its withdrawal therethrough. Thus, referring to Figures 4 and 5, I have shown a washer 5 surrounding the wire 3 and secured against the end face of the conduit by deforming the wire therebeyond to form wings 6 extending out beyond the aperture in the washer.

To facilitate the joining of the sections, wires may be cut in predetermined lengths at the factory, and washers secured to one end thereof by deforming the wire as described. This makes it unnecessary to clamp only one end of the wire at the time the sections are assembled into lengths.

It may also be desirable under some conditions to deform one end of the wire as described and to thread the other end and utilize a nut screwed onto the threaded portion for pressing the sections together and securing them permanently in that position.

To maintain in alignment the contiguous ends of the adjacent lengths of conduit constructed as described, other holes 1 may be formed in the walls of the end sections of each length at diametrically opposite points midway between the holes 1 containing the wires 3. The projecting ends of the wires 3 of one length can then be inserted in the holes 1 of the adjacent length. These joints may be made waterproof by grouting and wrapping in accordance with the prior practice.

Although I have shown in the drawing a unit length of conduit comprising four sections, it is to be understood that the lengths are not necessarily limited to any particular number of sections. In fact it may be desirable under certain conditions to form the sections of indefinite length by utilizing very long wires and threading the individual sections thereon as they are laid in the trench.

One practical advantage of utilizing long lengths is that the wires 3 being electrically conducting tend to distribute earth currents to a cable contained within the conduit over a relatively great length, thereby diminishing the intensity of the earth current flowing into or out of the cable at any one point and correspondingly reducing any damage that may result from electrolysis.

It is to be understood of course that if the conduit at all times remained water-tight, no electrolysis could take place, since there would be no conductive path from the soil surrounding the conduit to the cable within the conduit. However, due to the unavoidable imperfections in clay tile, there are occasionally small spots thereon which are imperfectly glazed. This permits the entry of moisture to the porous body of the vitrified clay beneath the glazed surface which thereby becomes conductive. If there are any earth potentials present which would tend to cause a flow of current between the soil and the cable within the conduit, such current is concentrated at the point of imperfection in the conduit so that the cable sheath is corroded and punctured at that particular spot much more quickly than it would be if the same current were distributed over a greater length of the cable.

The clay conduit commonly used is glazed by what is known as the salt glaze process in which the glaze is produced by vapors rising through the kiln in which the burning takes place. It is characteristic of tubing produced by this process that the glaze on the exterior is much more complete than that on the interior of the tubing. Because of this fact the inner surface of the conduit is usually so imperfectly glazed that when moisture is admitted it makes the walls of the conduit relatively conductive. Therefore, when clay conduit is assembled on wires in accordance with my invention there may be a conductive path between each wire and the cable within the conduit, substantially throughout the length of the wire. As a result, if a flow of current is induced from the surrounding soil through a small porous spot in the exterior of the conduit, this current will be distributed by one or both of the connecting wires throughout the whole length of the conduit, and will flow from the wire to the cable at the various points along its length, thus reducing the intensity of the current at any one point and correspondingly reducing the damage due to electrolysis.

It is to be understood that leaks may also take place between the ends of the tile due to a defective joint therebetween. In this case, the wires may also tend to reduce the local electrolytic action on the cable in the same way pointed out above.

Although, I have shown a conduit in which two wires are placed in diametrically opposite holes in the conduit, it is to be understood that any desired number may be used, and in some instances it may be desirable to use a larger number than two, in order to produce a sufficiently strong and rigid structure.

I claim:

A conduit comprising a plurality of sections, each section having a plurality of symmetrically disposed longitudinal holes through its walls, retaining wires extending through the holes in the various sections from end to end of said conduit, and means secured to the ends of each retaining wire and bearing against the end faces of said conduit for holding said sections together, said wires projecting a short distance from the end face of said conduit to serve as dowel pins, and dowel holes in the end faces of said conduit and positioned intermediate said wires.

HOWARD W. JEWELL.